April 23, 1935.   P. W. BIDWELL   1,998,977
BINDING FOR BOOKS
Filed April 23, 1934
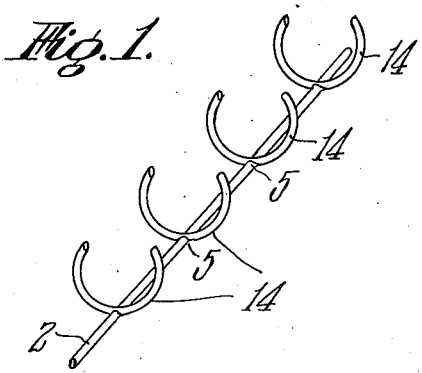
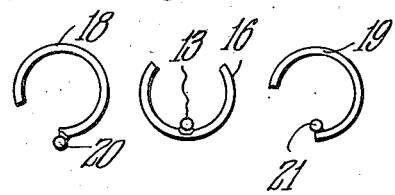
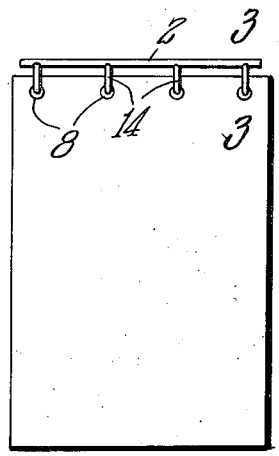
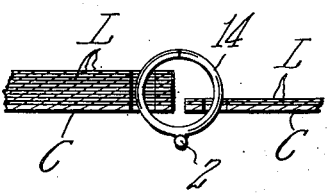
INVENTOR.
Paul W. Bidwell.
BY
ATTORNEY.

Patented Apr. 23, 1935

1,998,977

UNITED STATES PATENT OFFICE 1,998,977

BINDING FOR BOOKS

Paul W. Bidwell, Holyoke, Mass.

Application April 23, 1934, Serial No. 721,857

3 Claims. (Cl. 129—1)

This invention relates to improvements in notebooks and the like and is directed more particularly to improvements in books having novel binding means.

The principal objects of the invention are directed to the provision of a novel yet simple binding means for books. The improved binding is not only economical to manufacture by reason of its simplicity but is adapted for broad application to efficiently bind the leaves of a book so that they may swing relative to one another.

The novel features of the invention are adapted for broad application and the various novel features and particular advantages thereof will be hereinafter more fully referred to in connection with the accompanying description of the preferred form thereof, reference being had to the accompanying drawing, wherein:

Fig. 1 is a perspective view showing a binding device embodying the novel features of the invention.

Fig. 2 is a small scale plan view of a book showing the binder of the invention associated therewith.

Fig. 3 is an enlarged sectional elevational view on the line 3—3 of Fig. 2.

Figs. 4, 5 and 6 are end elevational views to illustrate modified forms of the binding device of the invention.

Fig. 7 is a side elevational view showing a further modified form of the invention, and Fig. 8 is an end elevational view showing a still further modified form of the invention.

Referring now to the drawing more in detail, the invention will be fully described.

In a broad way the binding device consists of a longitudinal supporting member which has fixed thereto a plurality of spaced ring-forming members receivable in the apertures or holes of leaves and adapted to be bent into the form of closed rings whereby the leaves may swing relative to one another by sliding on the said rings.

In Fig. 1 there is shown a longitudinally extending supporting or tie member 2 which may be in the form of a rod and made from wire. To this there are secured in spaced relation a plurality of ring-forming members such as 14. The members 14 are preferably of bendable material such as wire and are fixed to the member 2 in any suitable manner, preferably as by welding as indicated by 5.

In this way, the member 2 and members 14 provide a unitary structure. The member 2 may be of any desired length with the members 14 spaced therealong to coincide with the spacing of the holes in the leaves. In making up the binding, the member 2 may be long enough for cutting into a plurality of shorter lengths, all as may be desired.

The members 14 may be called open rings and, being bendable, are adapted to be closed to form closed rings. As in Figs. 2 and 3, the ring-forming members 14 are inserted in the apertures 8 of leaves L or the leaves and covers C of a book, and then are bent so that their ends are in close adjacency to form closed rings. It may be desirable to bend the members so that their ends abut or so the ends pass by one another.

It is an easy matter to assemble leaves, and covers when used, on the ring members and to then bend the members to closed ring-forming relation. When in the form of closed rings, the leaves may be swung relative to one another so that the book may lie flatwise or when desired the outermost leaves or covers may be brought into back to back relation without bending or distorting the edge portions of the leaves as is the case where the leaves are bound with staples, stitching, tape, and the like.

In Fig. 1, the ring-forming members 14 are disposed on top of the member 2 but as shown in Fig. 5, ring-forming members 16 may have the longitudinal member 13 on the inside thereof.

In another way, as shown in Fig. 4, the ring-forming members 18 have one end disposed adjacent the longitudinal member 20 so that when the rings are closed, the abutting ends thereof will be closed adjacent the member 20. Also, the longitudinal member 21 may be located adjacent the ends of ring-forming members 19 and inside thereof as shown in Fig. 6.

It may be desirable in some cases as shown in Fig. 7 to offset the longitudinal member 22 as at 24 so that the offset portion is within the ring-forming members 26. Also, as shown in Fig 8, the ring members 40 may have offset portions 42 to receive the longitudinal member 44.

In any case the ring-forming members are fixed to the longitudinal member to provide a unitary structure and may be accomplished by welding. The ring members are spaced to coincide with the spacing of the apertures of the leaves with which the binder is to be used and the spacing may of course vary within wide limits. The ring-forming members are preferably of bendable material such as wire so that they retain their closed ring-like shape with the ends thereof in abutment or otherwise in closely adjacent relation. In this way the leaves of a book are arranged to freely swing on the rings. When desired, the rings may be opened up to permit removal or addition of leaves and rebent to closed relation.

It will be observed that the device of the invention is simple in form so as to be economical to manufacture yet it is adapted to efficiently provide a means to facilitate free hinging of the leaves. As distinguished from prior art bindings the book may be opened up to lie flat on a support or so the outermost leaves or covers may be brought into back to back relation. At the same time the rings are in permanently closed position except when it is desired to open them for changing or insertion of leaves.

The device may be made in any desired lengths or in a relatively long strip so that it may be cut to provide shorter lengths. This is all to the end that the device is adapted for wide application to produce the desired results at low cost.

While I have described the invention in great detail and with respect to the present preferred forms thereof, it is not desired to be limited thereto since many changes and modifications may be made therein without departing from the spirit and scope of the invention. What I desire to claim and secure by Letters Patent of the United States is:

1. A unitary binding device for the leaves of books which are perforated with rows of spaced holes adjacent their edges comprising in combination, a substantially straight elongated, rod-like tie member of wire and a plurality of separate relatively shorter rod-like ring-forming members of substantially equal length formed from bendable wire and having non-joined opposite ends, said ring-forming members being rigidly fixed to said tie member transversely thereof at spaced intervals therealong and each having a free end portion extending away from its jointure with the tie member which is arranged for inserting in the perforations of said leaves and adapted for bending to bring their said opposite ends into close adjacency to form substantially closed rings with the adjacent ends of each ring in substantial alignment with the adjacent ends of the other rings on a line substantially parallel with said tie member.

2. A unitary binding device for the leaves of books which are perforated with rows of spaced holes adjacent their edges comprising in combination, a substantially straight elongated rod-like tie member of wire and a plurality of separate relatively shorter rod-like ring-forming members of substantially equal length formed from bendable wire and having non-joined opposite ends, said ring-forming members being rigidly fixed intermediate their said opposite ends to said tie member transversely thereof at spaced intervals therealong and each having a free end portion extending away from its jointure with the tie member which is arranged for inserting in the perforations of said leaves and adapted for bending to bring their said opposite ends into close adjacency to form substantially closed rings with the adjacent ends of each ring in substantial alignment with the adjacent ends of the other rings on a line substantially parallel with said tie member.

3. A unitary binding device for the leaves of books which are perforated with rows of spaced holes adjacent their edges comprising in combination, a substantially straight elongated rod-like tie member of wire and a plurality of spaced separate relatively shorter rod-like ring-forming members of substantially equal length formed from bendable wire and having non-joined opposite ends, each of said ring-forming members having an end portion rigidly fixed to said tie member transversely thereof and an opposite end portion extending freely away from the jointure with the tie member which is arranged for inserting in the perforations of said leaves and adapted for bending to bring the said opposite ends into close adjacency to form substantially closed rings with the adjacent ends of each ring in substantial alignment with the adjacent ends of the other rings on a line substantially parallel with said tie member.

PAUL W. BIDWELL.